(12) United States Patent
Hasuka et al.

(10) Patent No.: US 6,691,810 B2
(45) Date of Patent: Feb. 17, 2004

(54) APPARATUS FOR CONTROLLING FUEL CELL VEHICLE

(75) Inventors: Yoshinobu Hasuka, Wako (JP); Satoshi Aoyagi, Wako (JP); Asao Uenodai, Wako (JP); Hibiki Saeki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/165,164

(22) Filed: Jun. 6, 2002

(65) Prior Publication Data

US 2002/0189872 A1 Dec. 19, 2002

(30) Foreign Application Priority Data

Jun. 6, 2001 (JP) .................... 2001-170878
May 15, 2002 (JP) .................... 2002-139711

(51) Int. Cl.$^7$ ................................ B60L 8/00
(52) U.S. Cl. .............. 180/65.3; 180/65.1; 429/22; 429/24; 701/22
(58) Field of Search ............... 180/65.3, 65.1, 180/65.4, 65.5, 65.8, 300, 277, 279, 284; 701/22; 429/22, 23, 24, 25

(56) References Cited

U.S. PATENT DOCUMENTS

| | | | | |
|---|---|---|---|---|
| 5,713,426 A | * | 2/1998 | Okamura | .......... 180/65.3 |
| 6,083,637 A | * | 7/2000 | Walz et al. | .......... 429/22 |
| 6,458,478 B1 | * | 10/2002 | Wang et al. | .......... 429/22 |
| 6,497,972 B1 | * | 12/2002 | Iwasaki | .......... 429/25 |
| 6,591,924 B2 | * | 7/2003 | Shimizu | .......... 180/65.1 |
| 6,602,624 B1 | * | 8/2003 | Doan et al. | .......... 429/22 |
| 6,607,855 B2 | * | 8/2003 | Ueda et al. | .......... 429/24 |
| 6,617,066 B2 | * | 9/2003 | Sugawara | .......... 429/22 |

\* cited by examiner

*Primary Examiner*—Brian L. Johnson
*Assistant Examiner*—Hau Phan
(74) *Attorney, Agent, or Firm*—Lahive & Cockfield, LLP

(57) ABSTRACT

An upper limit amount of discharged electric energy calculator calculates an upper limit amount of discharged electric energy (Pcap_LMT), which represents a discharged electric energy of a capacitor when the amount of electric energy discharged by a fuel cell stack is equal to an upper limit amount of electric energy (Ifc_LMT) generated by the fuel cell stack. An output limit electric energy calculator calculates an output limit electric energy (PLD), which represents an upper limit amount of the electric energy that can be outputted to a motor. A torque command determining unit determines a torque command (TRQ_CMD) such that the electric energy consumed by the motor and a motor driver will not exceed the output limit electric energy (PLD).

2 Claims, 4 Drawing Sheets

APPARATUS FOR CONTROLLING FUEL CELL VEHICLE

BACKGROUND OF THE INVENTION

1. Field of the Invention

The present invention relates to an apparatus for controlling a fuel cell vehicle having a fuel cell stack and an electric double layer capacitor which are connected parallel to each other as a power supply for a propulsive motor of the fuel cell vehicle, and more particularly to the art of limiting the electric energy that is outputted to the propulsive motor to propel the fuel cell vehicle.

2. Description of the Related Art

One known control apparatus for use on a fuel cell vehicle for controlling the supply of electric energy consumed by the fuel cell vehicle is shown in FIG. 4 of the accompanying drawings.

As shown in FIG. 4, the control apparatus has a fuel cell 102 as a power supply for a motor drive unit 101 which supplies electric energy to a propulsive motor 100 and electric accessories (not shown) such as an air-conditioning unit, etc. An electric double layer capacitor 103 is connected parallel to the fuel cell 102 for discharging electric energy to make up for a shortage of electric energy generated by the fuel cell 102 when the amount of reactive gases supplied to the fuel cell 102 becomes insufficient due to a response delay of a reactive gas supply unit 104.

A fuel cell control unit 105 detects an operating state of the fuel cell 102 based on the pressure (Pgas), the flow rate (Qgas), and the temperature (Tgas) of reactive gases (hydrogen and air) supplied to the fuel cell 102, and recognizes an upper limit amount of amount (Ifc_LMT) of the electric energy that can be outputted from the fuel cell 102 based on the detected operating state. An electric vehicle control unit 106 calculates a motor-requested electric energy (PD_REQ) which is required to energize the motor 100 based on the amount of depression (Ap) of an accelerator pedal on the vehicle and the rotational speed (Nm) of the motor 100.

A power supply management control unit 107 indicates a target amount of electric energy (Ifc_CMD) to be generated by the fuel cell 102 to the fuel cell control unit 105 depending on the motor-requested electric energy (PD_REQ) and an electric energy (Pload) consumed by the electric accessories. The power supply management control unit 107 also indicates an output limit electric energy (PLD) which represents an upper limit amount of the electric energy that can be outputted from the motor drive unit 101 to the motor 100, depending on the upper limit amount of generated electric energy (Ifc_LMT), to the electric vehicle control unit 106 so that the amount of electric energy generated by the fuel cell 102 will not become insufficient.

The fuel cell control unit 105 determines a command value of the supplied amount of reactive gases (CMP_CMD) for the reactive gas supply unit 104 in order to achieve the target amount of electric energy (Ifc_CMD). The electric vehicle control unit 106 determines a torque command (TQ_CMD) for the motor drive unit 101 so that the electric energy outputted to the motor 100 will not exceed the output limit electric energy (PLD).

As a result, the fuel cell 102 operates to generate an amount of electric energy depending on the motor-requested electric energy (PD_REQ). Since the electric energy outputted from the motor drive unit 101 to the motor 100 is limited to an amount equal to or smaller than the output limit electric energy (PLD), the amount of electric energy generated by the fuel cell 102 is preventing from becoming insufficient.

When water produced by an electrochemical reaction of the reactive gases is trapped in cell units of the fuel cell 102, the output electric energy of the fuel cell 102 is lowered. If the fuel cell 102 suffers such a malfunction, then its electric generating capability is reduced, and the upper limit amount of generated electric energy (Ifc_LMT) is also reduced. If the upper limit amount of generated electric energy (Ifc_LMT) is reduced, the output limit electric energy (PLD) is also reduced, lowering an upper limit of the torque command (TRQ_CMD) for the motor drive unit 101.

Therefore, when the fuel cell 102 malfunctions, causing a sudden drop of the upper limit amount of generated electric energy (Ifc_LMT), while the fuel cell vehicle is running, the output torque produced by the motor 100 is abruptly reduced due to a reduction in the upper limit of the torque command (TRQ_CMD). As a result, the driver and passengers of the fuel cell vehicle are likely to suffer anxiety and discomfort the instant the output torque produced by the motor 100 is abruptly reduced.

SUMMARY OF THE INVENTION

It is therefore an object of the present invention to provide a control apparatus for controlling a fuel cell vehicle to prevent the output torque of a propulsive motor from dropping sharply in the even of a malfunction of a fuel cell mounted on the fuel cell vehicle.

According to the present invention, there is provided an improvement over an apparatus for controlling a fuel cell vehicle having motor driving means for outputting electric energy depending on a given torque command to a propulsive motor, a fuel cell for use as a power supply for the motor driving means, and an electric double layer capacitor connected parallel to the fuel cell, for being charged by the fuel cell and discharged to supplement a shortage of an amount of electric energy generated by the fuel cell.

The apparatus comprises upper limit electric energy recognizing means for detecting an operating state of the fuel cell and recognizing an upper limit amount of electric energy generated by the fuel cell depending on the detected operating state, upper limit discharged electric energy recognizing means for recognizing an upper limit amount of discharged electric energy representing an amount of electric energy discharged from the electric double layer capacitor when the amount of electric energy generated by the fuel cell reaches the upper limit amount of generated electric energy, upper limit total electric energy recognizing means for recognizing an upper limit amount of total electric energy representing an upper limit amount of total electric energy which can be outputted from the fuel cell and the electric double layer capacitor, depending on the upper limit amount of discharged electric energy and the upper limit amount of generated electric energy, and torque command limiting means for limiting the torque command to at most an upper limit of torque depending on the upper limit amount of total electric energy.

The upper limit total electric energy recognizing means recognizes the upper limit amount of total electric energy depending on the upper limit amount of generated electric energy of the fuel cell and the upper limit amount of discharged electric energy of the electric double layer capacitor. Even if the fuel cell malfunctions and the upper limit amount of generated electric energy of the fuel cell which is recognized by the upper limit electric energy recognizing means sharply drops, a reduction in the upper limit amount of total electric energy is suppressed by an amount of electric energy discharged from the electric double layer capacitor.

The torque command limiting means limits the torque command to at most the upper limit of torque depending on the upper limit amount of total electric energy. When the fuel cell malfunctions while the fuel cell vehicle is running, the torque command for the motor is prevented from being abruptly reduced, thus preventing the output torque of the motor from being lowered. Accordingly, the driver and passengers of the fuel cell vehicle are prevented from suffering anxiety and discomfort due to a change in the behavior of the fuel cell vehicle which would otherwise be caused by a sharp decrease in the output torque of the motor.

The apparatus further comprises open voltage recognizing means for recognizing an open voltage across the electric double layer capacitor, and storage means for storing data of a characteristic map representing the correlation between the amount of electric energy generated by the fuel cell and the output voltage thereof and data of an internal resistance of the electric double layer capacitor, the upper limit discharged electric energy recognizing means comprising means for calculating the upper limit amount of discharged electric energy based on the output voltage of the fuel cell which is obtained by applying the upper limit amount of generated electric energy to the characteristic map, the open voltage across the electric double layer capacitor which is recognized by the open voltage recognizing means, and the internal resistance of the electric double layer capacitor.

The upper limit discharged electric energy recognizing means applies the upper limit amount of generated electric energy to the characteristic map, and can recognize the output voltage of the fuel cell from the characteristic map at the time the amount of electric energy generated by the fuel cell reaches the upper limit amount of generated electric energy. The upper limit discharged electric energy recognizing means can calculate the upper limit amount of discharged electric energy with accuracy, using the output voltage of the fuel cell at the upper limit amount of generated electric energy, the open voltage across the electric double layer capacitor, and the internal resistance of the electric double layer capacitor.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

A control apparatus for controlling a fuel cell vehicle according to the present invention will be described below with reference to FIGS. 1 through 3.

Figure 1:
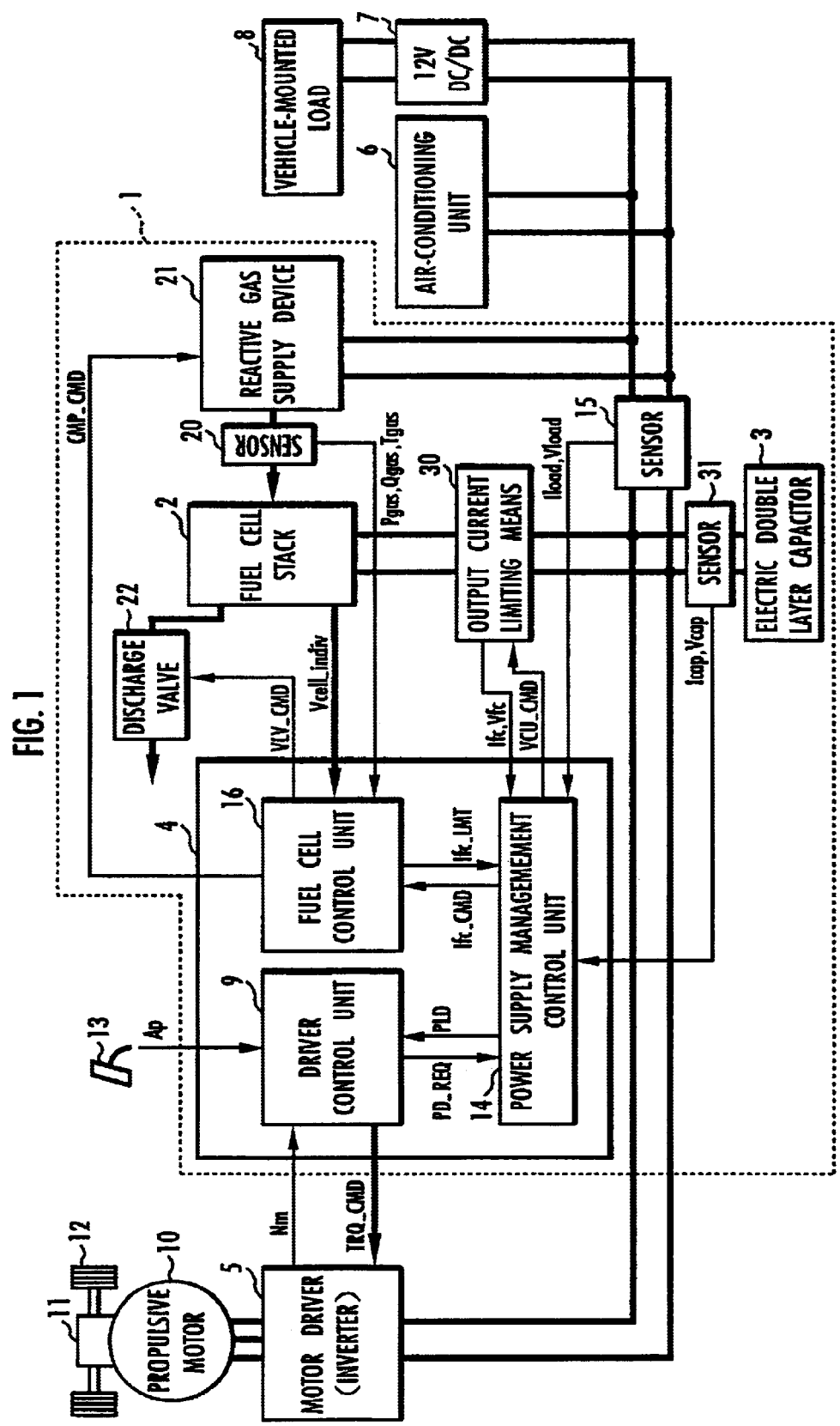
FIG. 1 is a block diagram of a control apparatus for controlling a fuel cell vehicle according to the present invention.

As shown in FIG. 1, a control apparatus 1 for controlling a fuel cell vehicle according to the present invention is mounted on a fuel cell vehicle and serves to control electric energy supplied to the fuel cell vehicle. Operation of the control apparatus 1 is controlled by a controller 4 which comprises a microcomputer, a memory (corresponding to a storage means according to the present invention), etc. The controller 4 has, as its functions, a driver control unit 9, a power supply management control unit 14, and a fuel cell control unit 16.

A fuel cell stack 2 is mounted on the fuel cell vehicle outputs a current due to an electrochemical action of reactive gases including hydrogen and air. The amount of electric energy generated by the fuel cell stack 2 is controlled by the power supply management control unit 14 and the fuel cell control unit 16 of the controller 4. A torque command for a propulsive motor 10 (hereinafter referred to as "motor 10") is determined by the driver control unit 9 of the controller 4.

The output electric energy produced by the fuel cell stack 2 and an electric double layer capacitor 3 (hereinafter referred to as "capacitor 3") is supplied to a motor driver 5 (corresponding to a motor driving means according to the present invention), an air-conditioning unit 6, and a 12-V vehicle-mounted load 8 through a DC/DC converter 7. The motor driver 5 controls currents flowing through the armatures of the motor 10 depending on a torque command (TRQ_CMD) outputted from the driver control unit 9. The drive power generated by the motor 10 is transferred to drive wheels 12 through a transmission 11.

The driver control unit 9 outputs a signal indicative of a motor-requested electric energy (PD_REQ) which is required by the motor driver 5 based on the amount of depression (Ap) of an accelerator pedal 13 and the rotational speed (Nm) of the motor 10, to the power supply management control unit 14.

The power supply management control unit 14 is supplied with detected signals indicative of a load current (I_load) and a load voltage (V_load) which are detected by a load current sensor 15 in order to recognize the electric energy consumed by electric accessories other than the motor 10.

The power supply management control unit 14 takes into account an upper limit amount of electric energy (Ifc_LMT) generated by the fuel cell stack 2 that is supplied from the fuel cell control unit 16 (corresponding to an upper limit electric energy recognizing means according to the present invention) and a current (Icap) charged into and discharged from the capacitor 3 and a voltage (Vcap) across the capacitor 3, which are detected by a capacitor sensor 31, determines a target amount of electric energy (Ifc_CMD) which is a target value for a current outputted from the fuel cell stack 2 depending on the sum of the motor-requested electric energy (PD_REQ) and the electric energy consumed by the electric accessories other than the electric motor 10, and outputs a signal representative of the determined target amount of electric energy (Ifc_CMD) to the fuel cell control unit 16.

The power supply management control unit 14 outputs a signal indicative of an output limit electric energy (PLD) representing an upper limit amount of the electric energy that can be supplied from the fuel cell stack 2 and the capacitor 3 to the driver control unit 9, to the driver control unit 9.

The fuel cell control unit 16 is supplied with detected signals outputted from a reactive gas sensor 20 and indicating a pressure (Pgas), a flow rate (Qgas), and a temperature (Tgas) of reactive gases (hydrogen and air) supplied to the fuel cell stack 2, and detected signals indicative of states (Vcell_indiv) of individual fuel cells (not shown) that make up the fuel cell stack 2. The fuel cell control unit 16 determines the upper limit amount of generated electric energy (Ifc_LMT) in view of the state of the fuel cell stack 2 as recognized from these detected signals.

The driver control unit 9 outputs a signal indicative of a torque command (TRQ_CMD) to the motor driver 5 so that the electric energy consumed by the motor 10 and the motor driver 5 will not exceed the output limit electric energy (PLD) indicated by the power supply management control unit 14. The motor driver 5 controls the armature currents of the motor 10 to cause the motor 10 to generate a torque depending on the torque command (TRQ_CMD).

The fuel cell control unit 16 outputs a signal indicative of a target amount of reactive gases (CMP_CMD) supplied to the fuel cell stack 2 to a reactive gas supply device 21 so that the fuel cell stack 2 will output a current according to the target output current (Ifc_CMD) outputted from the power supply management control unit 14. Based on the target amount of reactive gases (CMP_CMD), the reactive gas supply device 21 supplies air and hydrogen at a rate depending on the target amount of electric energy (Ifc_CMD).

Hydrogen supplied from the reactive gas supply device 21 is supplied to hydrogen electrodes of the fuel cell stack 2 through an ejector (not shown) and a humidifier (not shown), and reacts electrochemically with oxygen in air supplied to air electrodes of the fuel cell stack 2, producing water which is discharged through a discharge valve 22. The opening of the discharge valve 22 is controlled by a control signal (VLV_CMD) supplied from the fuel cell control unit 16 in order to keep the pressure in the fuel cell stack 2 at a constant gradient depending on the pressures of the supplied air and hydrogen.

The fuel cell stack 2 has a water-cooled cooling unit (not shown). The fuel cell control unit 16 controls the rate and temperature of cooling water supplied to the water-cooled cooling unit depending on the temperature of the cooling water supplied to the water-cooled cooling unit and the temperature of the cooling water discharged from the water-cooled cooling unit.

The fuel cell power supply device 1 further includes an output current limiting means 30 (including the function of a current limiting means according to the present invention) for detecting an output current (Ifc) and an output voltage (Vfc) from the fuel cell stack 2, the output current limiting means 30 having switching elements such as transistors or FETs for limiting the output current of the fuel cell stack 2.

The output current limiting means 30 turns on or off the output current of the fuel cell stack 2 depending on the level (high/low) of a current limiting signal (VCU_CMD) outputted from the power supply management control unit 14.

Other than when the fuel cell stack 2 starts and stops operating, the power supply management control unit 14 basically makes the current limiting signal (VCU_CMD) high in level, keeping the output current limiting means 30 on, thus directly connecting the fuel cell stack 2 and the capacitor 3 to each other.

While the fuel cell stack 2 and the capacitor 3 are being directly connected to each other, when the total electric energy consumed by the motor 10 and the electric accessories other than the motor 10 increases and the output voltage of the fuel cell 2 drops, a discharged current depending on the difference between the open voltage of the capacitor 3 and the output voltage of the fuel cell stack 2 is supplied from the capacitor 3 to the motor 10 and the electric accessories other than the motor 10. When the total electric energy consumed by the motor 10 and the electric accessories other than the motor 10 decreases and the output voltage of the fuel cell stack 2 increases, a charging current depending on the difference between the open voltage of the capacitor 3 and the output voltage of the fuel cell stack 2 is supplied from the fuel cell stack 2 to the capacitor 3.

As a result, in either case, the open voltage of the capacitor 3 and the output voltage of the fuel cell stack 2 become equal to each other. Therefore, as in the case where a battery whose open voltage does not change largely even when its remaining charged quantity changes, it is not necessary to match the output voltage of the fuel cell stack 2 with the open voltage of such a battery with a large-size DC/DC converter capable of switching large currents.

The output current limiting means 30 may thus have small-size switching elements for limiting currents flowing between the capacitor 3 and the fuel cell stack 2 at the time the fuel cells stack 2 starts and stops operating when the output current of the fuel cell stack 2 is small.

With the above arrangement, the target amount of reactive gases (CMP_CMD) for the fuel cell stack 2 is controlled so that the fuel cell stack 2 will output a current depending on the target amount of electric energy (Ifc_CMD) that is determined depending on the motor-requested electric energy (PD_REQ) and the electric energy consumed by the electric accessories which is calculated based on the load current (I_load) and the load voltage (V_load). Therefore, basically, the motor 10 outputs a torque depending on the amount of depression (Ap) of the accelerator pedal 13 that is operated by the driver.

Water produced in the fuel cell stack 2 by an electrochemical reaction of the reactive gases in the fuel cell stack 2 may possibly not be fully discharged from the fuel cell stack 2 but may be trapped in the fuel cell stack 2. If such water is trapped in the fuel cell stack 2, then the reactive gases are not supplied to the fuel cell stack 2 by the trapped water, resulting in a malfunction in which the power generating efficiency of the fuel cell stack 2 drops.

When the fuel cell stack 2 suffers such a malfunction, the upper limit amount of generated electric energy (Ifc_LMT) recognized by the fuel cell control unit 16 is reduced, and the output limit electric energy (PLD) calculated by the power supply management control unit 14 depending on the upper limit amount of generated electric energy (Ifc_LMT) is also reduced, lowering an upper limit of the torque command (TRQ_CMD) determined by the driver control unit 9.

When the fuel cell stack 2 malfunctions, causing a sudden drop of the upper limit amount of generated electric energy (Ifc_LMT), and hence a sudden drop of the output limit electric energy (PLD), the output torque produced by the motor 100 is abruptly reduced due to a limitation posed by the torque command (TRQ_CMD), changing the behavior of the fuel cell vehicle to cause the driver and passengers of the fuel cell vehicle to suffer anxiety and discomfort.

The power supply management control unit 14 performs a process of preventing the torque command (TRQ_CMD) from being abruptly lowered due to a sharp decrease in the upper limit amount of generated electric energy (Ifc_LMT), by calculating the output limit electric energy (PLD) in view of the electric energy discharged from the capacitor 3.

The process performed by the power supply management control unit 14 will be described below with reference to FIGS. 2 and 3.

Figure 2:
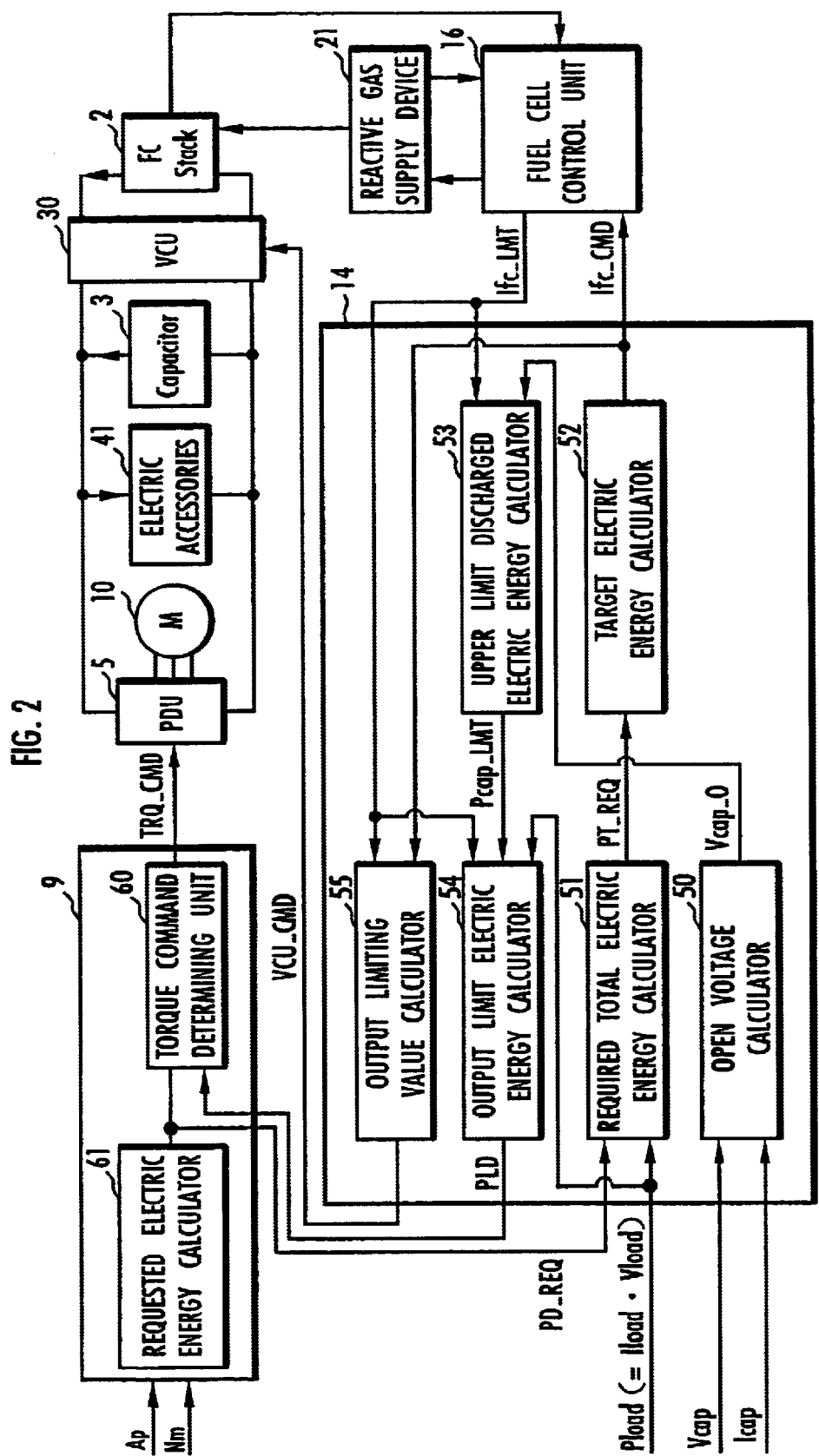
FIG. 2 is a detailed block diagram of a controller arrangement of the control apparatus shown in FIG. 1.

As shown in FIG. 2, the power supply management control unit 14 has an open voltage calculator 50

(corresponding to an open voltage recognizing means according to the present invention) for calculating an open voltage (Vcap_o) across the capacitor 3, a required total electric energy calculator 51 for calculating a required total electric energy (PT_REQ) which represents the sum of the electric energy (Pload) consumed by the electric accessories and the motor-requested electric energy (PD_REQ), a target electric energy calculator 52 for calculating the target amount of electric energy (Ifc_CMD) based on the required total electric energy (PT_REQ), and an upper limit discharged electric energy calculator 53 (corresponding to an upper limit discharged electric energy recognizing means according to the present invention) for calculating an upper limit amount of discharged electric energy (Pcap_LMT) which represents an electric energy discharged from the capacitor 3 when the amount of electric energy generated by the fuel cell stack 2 reaches the upper limit amount of generated electric energy (Ifc_LMT), based on the open voltage (Vcap_o) across the capacitor 3 and the upper limit amount of generated electric energy (Ifc_LMT).

The power supply management control unit 14 also has an output limit electric energy calculator 54 (corresponding to an upper limit total electric energy recognizing means according to the present invention) for calculating an output limit electric energy (PLD, corresponding to an upper limit amount of total electric energy according to the present invention) which represents a maximum value of electric energy that can be supplied to the motor driver 5, based on the upper limit amount of generated electric energy (Ifc_LMT), the upper limit amount of discharged electric energy (Pcap_LMT), and the electric energy (Pload) consumed by the electric accessories, and an output limiting value calculator 55 for outputting a current limiting signal (VCU_CMD) to switch the output current limiting means 30 so that the amount of electric energy generated by the fuel cell stack 2 will be equal to or lower than the upper limit amount of generated electric energy (Ifc_LMT), when the target amount of electric energy (Ifc_CMD) exceeds the upper limit amount of generated electric energy (Ifc_LMT).

The open voltage calculator 50 calculates an open voltage (Vcap_o) across the capacitor 3 based on a charging/discharging current (Icap) of the capacitor 3, an output voltage (Vcap) of the capacitor 3, and data of the internal resistance (Rap) of the capacitor 3 stored in the memory, according to the following equation (1):

$$Vcap\_o = Vcap + Icap \times Rcap \quad (1)$$

The required total electric energy calculator 51 calculates a required total electric energy (PT_REQ) from the electric energy (Pload) consumed by the electric accessories and the motor-requested electric energy (PD_REQ) according to the following equation (2):

$$PT\_REQ = Pload + PD\_REQ \quad (2)$$

The target electric energy calculator 52 calculates a target amount of electric energy (Ifc_CMD) to be generated by the fuel cell stack 2 in a manner to given a certain margin to the required total electric energy (PT_REQ).

The upper limit amount of discharged electric energy calculator 53 calculates an upper limit amount of discharged electric energy (Pcap_LMT) based on the open voltage (Vcap_o) across the capacitor 3 and the upper limit amount of generated electric energy (Ifc_LMT). A process of calculating the upper limit amount of discharged electric energy (Pcap_LMT) with the upper limit amount of discharged electric energy calculator 53 will be described below.

Figure 3:
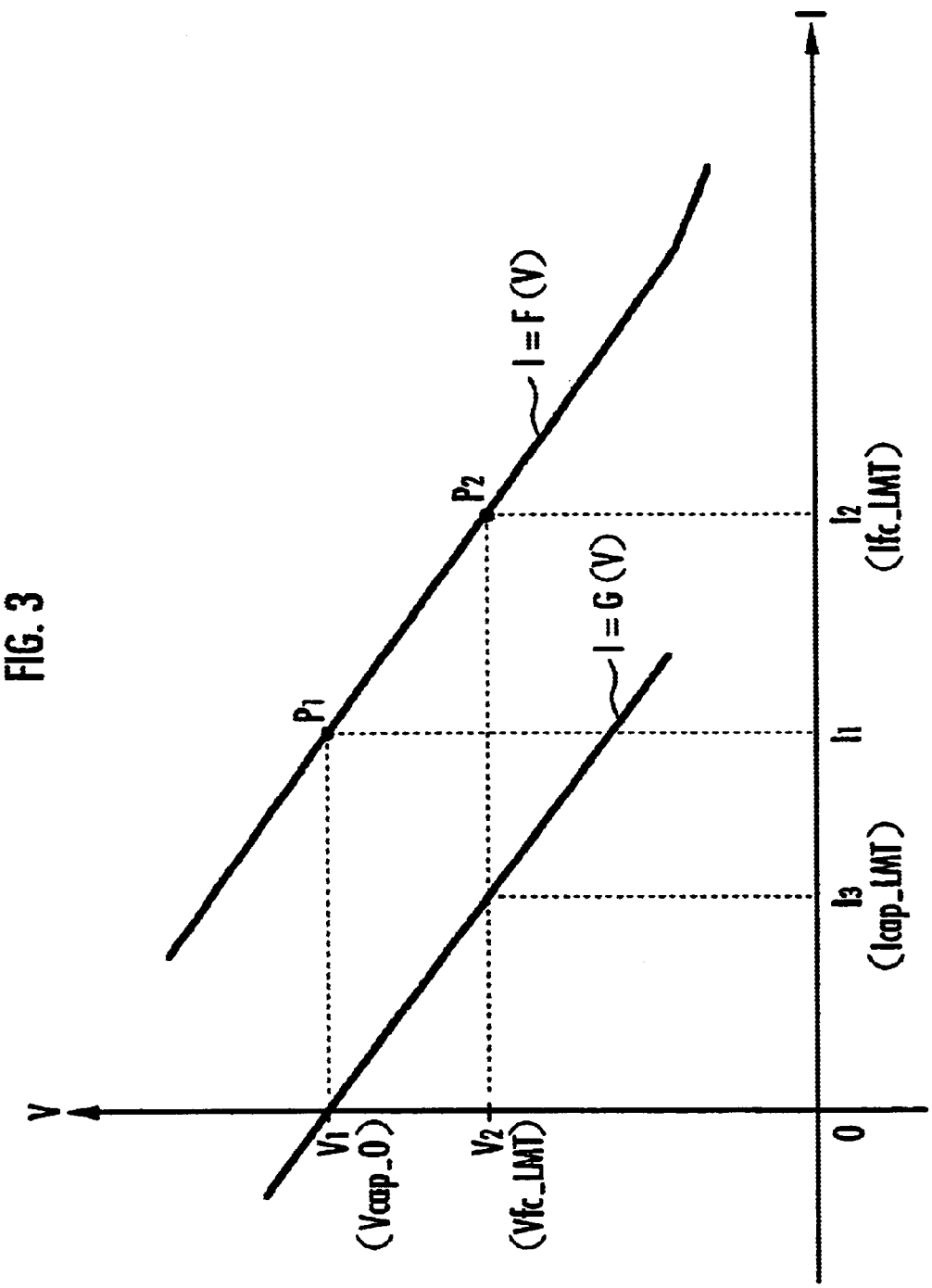
FIG. 3 is a graph showing output characteristics of a fuel cell stack and a capacitor in the control apparatus shown in FIG. 1.
Figure 4:
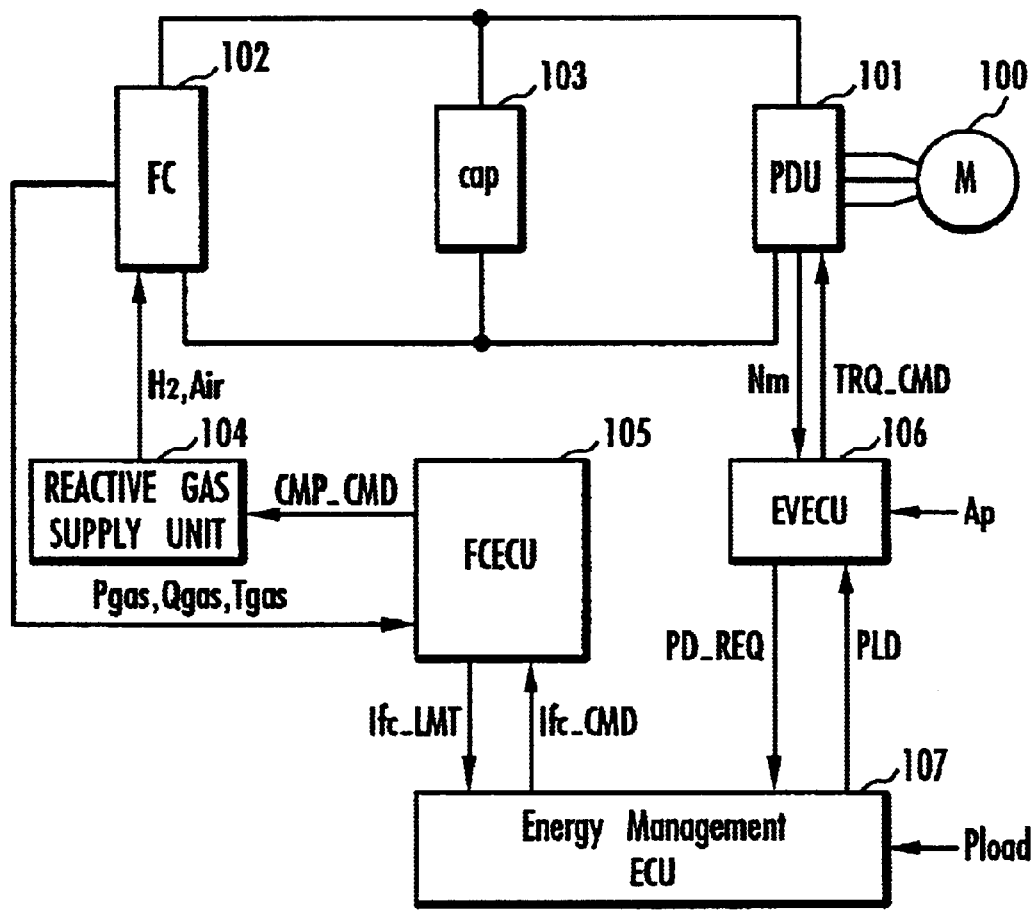
FIG. 4 is a block diagram of a conventional control apparatus for controlling a fuel cell vehicle.

FIG. 3 is a graph showing output characteristics of the fuel cell stack 2 and the capacitor 3, vertical axis representing voltage (V) and the horizontal axis current (I). In FIG. 3, a curve denoted by I=F(V) represents the output characteristics of the fuel cell stack 2, and a linear curve denoted by I=G(V) represents the output characteristics of the capacitor 3 when the open voltage (Vcap_o) is $V_1$.

In FIG. 3, if the fuel cell stack 2 operates at an operating point $P_1$ ($I_1$, $V_1$) and the upper limit amount of generated electric energy (Ifc_LMT) is represented by $I_2$, then the operating point of the fuel cell stack 2 becomes $P_2$ ($I_2$, $V_2$) when the amount of electric energy generated by the fuel cell stack 2 has changed to the upper limit amount of generated electric energy (Ifc_LMT). When the fuel cell stack 2 and the capacitor 3 are directly connected to each other, i.e., when the output current limiting means 30 does not limit the output current of the fuel cell stack 2, the output voltage (Vfc) of the fuel cell stack 2 and the output voltage (Vcap) of the capacitor 3 are equal to each other (Vfc=Vcap=$V_2$).

Therefore, the discharged current of the capacitor 3 when the output voltage (Vfc) of the fuel cell stack 2 is $V_2$ is represented by $I_3$ (=G($V_2$)), and the upper limit amount of discharged electric energy (Pcap_LMT) can be calculated by multiplying $I_2$ by $V_2$.

Since the gradient of the output characteristics I=G(V) of the capacitor 3 is represented by the internal resistance (Rcap) of the capacitor 3 and G(0)=Vcap_o, G(V) is expressed by the following equation (3):

$$G(V) = -Rcap \cdot I + Vcap\_o \quad (3)$$

Therefore, the discharged current (Icap_LMT) of the capacitor 3 when the output voltage of the capacitor 3 is Vfc_LMT is calculated according to the following equation (4):

$$Icap\_LMT = (Vcap\_o - Vfc\_LMT)/Rcap \quad (4)$$

Consequently, the upper limit amount of discharged electric energy (Pcap_LMT) of the capacitor 3 is calculated according to the following equation (5):

$$\begin{aligned}Pcap\_LMT &= Icap\_LMT \times Vfc\_LMT \\ &= (Vcap\_o - Vfc\_LMT)/Rcap \times Vfc\_LMT\end{aligned} \quad (5)$$

The memory stores the data of a map representing the relationship of I=F(V) (corresponding to the data of a characteristic map representative of the correlation between the amount of electric energy generated by the fuel cell stack and the output voltage thereof according to the present invention). The upper limit amount of discharged electric energy calculator 53 applies the upper limit amount of generated electric energy (Ifc_LMT) to the map, and recognizes an output voltage (Vfc_LMT) of the fuel cell stack 2 at the time the amount of electric energy generated by the fuel cell stack 2 becomes the upper limit amount of generated electric energy (Ifc_LMT). Then, the upper limit amount of discharged electric energy calculator 53 calculates an upper limit amount of discharged electric energy (Pcap_LMT) according to the above equation (4).

Thus, when the amount of electric energy generated by the fuel cell stack 2 becomes the upper limit amount of generated electric energy (Ifc_LMT), the capacitor 3 outputs an electric energy corresponding to the upper limit amount of discharged electric energy (Pcap_LMT). The output limit electric energy calculator 54 calculates an output limit electric energy (PLD), taking the upper limit amount of discharged electric energy (Pcap_LMT) into account, according to the following equation (6):

$$PLD = Ifc\_LMT \cdot Vfc\_LMT + Pcap\_LMT - Pload \quad (6)$$

A torque command determining unit 60 (including the function of a torque command limiting means according to the present invention) of the driver control unit 9 compares the motor-requested electric energy (PD_REQ) calculated by a requested electric energy calculator 61 of the driver control unit 9 with the output limit electric energy (PLD), and determines a torque command (TRQ_CMD) such that the electric energy supplied to the motor 10 will not exceed the output limit electric energy (PLD).

Since the output limit electric energy calculator 54 determines the output limit electric energy (PLD) in view of an amount of electric energy supplemented by the upper limit amount of discharged electric energy (Pcap_LMT) of the capacitor 3, the output limit electric energy (PLD) is prevented from sharply dropping when the upper limit amount of generated electric energy (Ifc_LMT) decreases abruptly.

Therefore, when the amount of electric energy generated by the fuel cell stack 2 sharply falls while the fuel cell vehicle is running, the upper limit of the torque command (TRQ_CMD) is prevented from sharply dropping, and hence the output torque of the motor 10 is also prevented from decreasing, so that the behavior of the fuel cell vehicle is prevented from becoming unstable.

In the present embodiment, the upper limit amount of discharged electric energy calculator 53 calculates the upper limit amount of discharged electric energy (Pcap_LMT), using the map of the output characteristics of the fuel cell stack 2 and the internal resistance (Rcap) of the capacitor 3, which are stored in the memory. However, the upper limit amount of discharged electric energy calculator 53 may calculate the upper limit amount of discharged electric energy (Pcap_LMT) in another way.

For example, the memory may store a map which outputs an upper limit amount of discharged electric energy (Pcap_LMT) based on input parameters representing the open voltage (Vcap_o) across the capacitor 3 and the upper limit amount of discharged voltage (Vfc_LMT), and the upper limit amount of discharged electric energy calculator 53 may calculate the upper limit amount of discharged electric energy (Pcap_LMT) based on the map.

If the output current limiting means 30 limits a current which is outputted from the fuel cell stack 2 due to its own temperature, then the output current limiting means 30 may limit the amount of electric energy generated by the fuel cell stack 2 to a limited amount of generated electric energy (Ifc_VCU) which is lower than the upper limit amount of generated electric energy (Ifc_LMT). In this case, the power supply management control unit 14 needs to check if the output current (Ifc) of the fuel cell stack 2 as detected by the output current limiting means 30 is smaller than the upper limit amount of generated electric energy (Ifc_LMT) or not.

If the power supply management control unit 14 detects that the output current (Ifc) is smaller than the upper limit amount of generated electric energy (Ifc_LMT), then the upper limit amount of discharged electric energy calculator 53 may calculate the upper limit amount of discharged electric energy (Pcap_LMT) by replacing the voltage (Vfc_LMT) depending on the upper limit amount of generated electric energy according to the equation (4) with a voltage (=F(Ifc_VCU) depending on the limited amount of generated electric energy (Ifc_VCU). The output limit electric energy calculator 54 may calculate the output limit electric energy (PLD) by replacing the upper limit amount of generated electric energy (Ifc_LMT) and the voltage (Vfc_LMT) depending thereon in the equation (5) respectively with the limited amount of generated electric energy (Ifc_VCU) and the voltage (=F(Ifc_VCU) depending thereon.

Although a certain preferred embodiment of the present invention has been shown and described in detail, it should be understood that various changes and modifications may be made therein without departing from the scope of the appended claims.

What is claimed is:

1. An apparatus for controlling a fuel cell vehicle, comprising:

motor driving means for outputting electric energy depending on a given torque command to a propulsive motor;

a fuel cell for use as a power supply for said motor driving means;

an electric double layer capacitor connected parallel to said fuel cell, for being charged by said fuel cell and discharged to supplement a shortage of an amount of electric energy generated by said fuel cell;

upper limit electric energy recognizing means for detecting an operating state of said fuel cell and recognizing an upper limit amount of electric energy generated by said fuel cell depending on the detected operating state;

upper limit discharged electric energy recognizing means for recognizing an upper limit amount of discharged electric energy representing an electric energy discharged from said electric double layer capacitor when the amount of electric energy generated by said fuel cell reaches said upper limit amount of generated electric energy;

upper limit total electric energy recognizing means for recognizing an upper limit amount of total electric energy representing an upper limit amount of total electric energy which can be outputted from said fuel cell and said electric double layer capacitor, depending on said upper limit amount of discharged electric energy and said upper limit amount of generated electric energy; and torque command limiting means for limiting said torque command to at most an upper limit of torque depending on said upper limit amount of total electric energy.

2. An apparatus according to claim 1, further comprising:

open voltage recognizing means for recognizing an open voltage across said electric double layer capacitor; and storage means for storing data of a characteristic map representing the correlation between the amount of electric energy generated by said fuel cell and the output voltage thereof and data of an internal resistance of said electric double layer capacitor;

said upper limit discharged electric energy recognizing means comprising means for calculating said upper limit amount of discharged electric energy based on the output voltage of said fuel cell which is obtained by applying said upper limit amount of generated electric energy to said characteristic map, the open voltage across said electric double layer capacitor which is recognized by said open voltage recognizing means, and the internal resistance of said electric double layer capacitor.

* * * * *